No. 760,355. PATENTED MAY 17, 1904.
F. SWALES.
BIT.
APPLICATION FILED JULY 16, 1903.
NO MODEL.
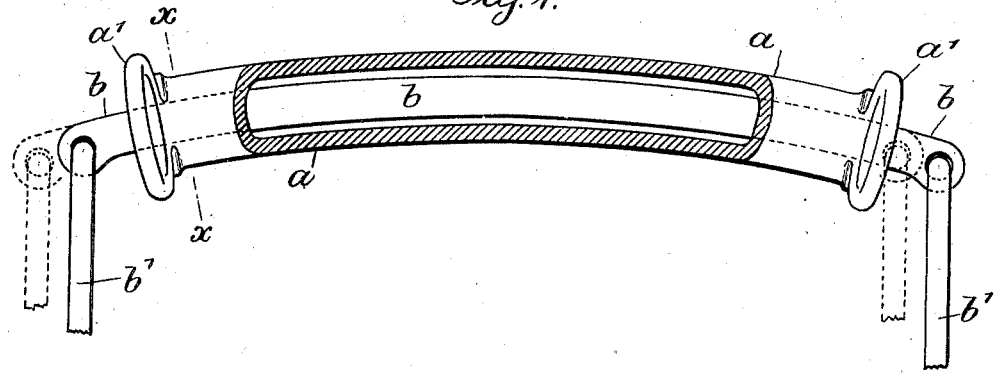
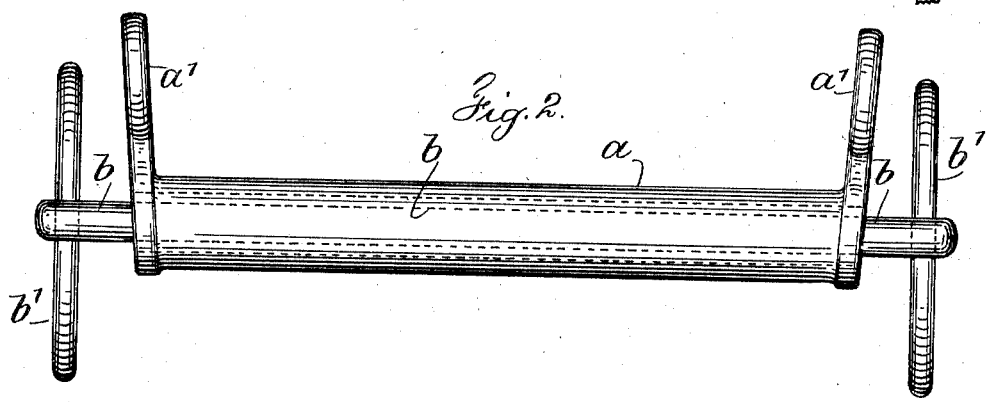
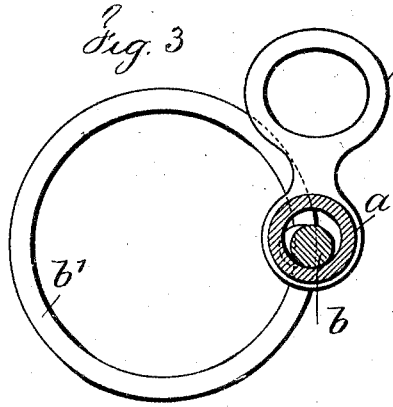
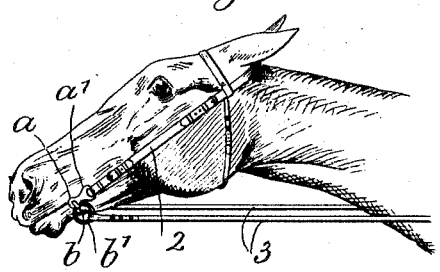
Witnesses
Chas H. Smith
J. Staib
Inventor
Frank Swales
per Harold Serrell
atty No. 760,355. Patented May 17, 1904.

UNITED STATES PATENT OFFICE.

FRANK SWALES, OF NEW YORK, N. Y.

BIT.

SPECIFICATION forming part of Letters Patent No. 760,355, dated May 17, 1904.

Application filed July 16, 1903. Serial No. 165,732. (No model.)

*To all whom it may concern:*

Be it known that I, FRANK SWALES, a subject of the King of Great Britain, residing in the borough of Manhattan, in the city, county, and State of New York, have invented an Improvement in Bits, of which the following is a specification.

My invention relates to bits for harness and saddle horses, and especially to bits for race-horses. Heretofore the jointed and slender bits usually employed have been very liable to cut and injure the tongue and lips of the horse, and causing pain and irritation have been the means of making otherwise good animals temporarily unserviceable. Also these forms of bits moving in the animal's mouth by pulling upon the reins not only irritates the animal, but disarranges and shifts the bridle, causing the same to be too taut on one side and too loose on the opposite side, and consequently to be insecure.

In carrying out my invention my improved bit is composed of two parts—an outer and open-ended tubular part to pass across in the mouth of the horse, with eye ends to which the bridle-straps are buckled, and an inner part of less diameter and movable freely in the tubular part and of appreciably greater length than the tubular part. Consequently an increased leverage is effected which augments the driver's power on the lines. This inner part has ring ends for the attachment of the reins.

In the drawings, Figure 1 is an elevation and partial section. Fig. 2 is an elevation at right angles to the position Fig. 1 in order to show the divergence of certain parts. Fig. 3 is a cross-section and partial elevation at $x$ $x$ of Fig. 1; and Fig. 4 is a view of the head of a horse, illustrating the application of my invention.

$a$ represents the tubular open-ended part adapted to pass across within the mouth of the horse. This is straight in one direction, as shown in Fig. 2, and curved in the other direction, as shown in Fig. 1. The part $a$ at either end is provided with eye ends $a'$, to which the bridle-straps 2 are connected. These eye ends diverge or are spread apart, or, in other words, occupy an obtuse angle to the surface of the tubular part $a$, as will appear by special reference to Fig. 2. This is for the purpose of giving said ends clearance at the sides of the mouth of the horse and room for the attachment thereto of the bridle-straps, so that the same will not rub upon the cheeks of the horse.

The parts $a$ $a'$ may be made of any suitable material, and as the part $a$ is of liberal dimensions it may with advantage be made of aluminium, although it may equally well be made of steel or other suitable material. The bar $b$ is of appreciably less diameter than the inner diameter of the tubular open-ended part $a$. The bar $b$ is a member of the inner part and passes freely through the tubular part $a$, being movable lengthwise in said tubular part. This bar $b$ is of appreciably greater length than the tubular part $a$, and at its respective ends is provided with the ring $b'$.

The reins 3 are to be connected to the rings $b'$. The bridle-straps 2 may be comparatively snugly taken up, so as to determine the relation of the tubular part $a$ in the mouth of the horse, so that there may be no lost motion or unnecessary freedom. The eye ends $a'$ keep the tubular part $a$ from moving tranversely through the mouth of the horse.

The part $b$, movable in the part $a$, performs the function of increasing the leverage of the reins in driving the horse, because it will be apparent that if either rein is pulled upon with force this bar $b$ will slide through the tubular part $a$ in the direction of pull until the ring on its opposite end strikes against the distant end of the tubular part $a$. This position is shown in Fig. 1 by dotted lines. With this increased leverage the horse is more easily guided in any particular direction than would be the case if the part $b$ was of exactly the length of the part $a$. With equal tension upon both reins the bar $b$ and the rings $b'$ would probably occupy the position shown by full lines in Figs. 1 and 2; but with either rein drawn upon with force the bar $b$ would move through the tubular part $a$, so as to provide for the increased leverage in driving the horse.

It is well known that some horses are easier to guide than others, that some require less force to turn them than others. It is true, especially with race-horses, that some of them require considerable force to guide them, especially when they are in rapid motion in the race, and in view of the fact that jockeys are usually young men of light weight the extra leverage provided is a positive advantage as assisting their strength and making it necessary for them to put forth less effort to guide the animal than might otherwise be required.

A curved form in one direction is preferably given to the tubular open-ended part $a$, and a correspondingly-curved form given to the bar $b$, a curved form being not only more universally employed, but more advantageous and comfortable in the mouth of the horse.

It is also quite apparent that in the use of this device the parts $b$ $b'$ are substantially the only movable parts, as the parts $a$ $a'$ remain substantial fixtures in the mouth of the horse and the strain of turning is taken up at either one end or the other of the said tubular part, but without disarranging the same or the bridle upon the horse. Furthermore, if desired, the tubular part $a$ may be covered with rubber or leather, which substances are agreeable to some horses and assist them in getting hold or gripping the bit. As hereinbefore stated, the tubular part $a$ does not participate in any movement that is brought about by the line. Consequently the same does not have any detrimental effect on the lips or tongue of the horse.

The further advantage claimed for this structure is that the bar $b$ being loose in the tubular open-ended part $a$ and freely movable therein permits the parts to shake or rattle in relation to one another, and this produces an appreciable noise or rattle of the parts of the bit. This movement may be effected by the horse and enables the horse to what is termed "play with the bit," which is an important feature, especially with young horses that are being or which have lately been broken to harness.

A further advantage consists in the fact that even should the horse grip the tubular part the control of the horse will not be lost, because of the movability of the inner part from side to side and with reference to the tubular part, which permits a full control to be obtained of the animal.

I claim as my invention—

1. A bit comprising a tubular open-ended part, straight in one direction and curved in a direction at right angles thereto and means connected therewith and to which the bridle-straps may be attached and an inner part comprising a bar passing freely through and movable in the tubular part and having ring ends thereto for the reins.

2. A bit comprising a tubular open-ended part straight in one direction and curved in a direction at right angles thereto with eye ends formed therewith and to which the bridle-straps may be connected, an inner part comprising a bar of metal passing freely through the tubular part and appreciably longer than and movable in the tubular part with ring ends formed therewith to which the reins may be connected.

3. A bit comprising a tubular open-ended part, straight in one direction and curved in a direction at right angles thereto and having integral eye ends that diverge from the straight line of the tubular part and to which the bridle-straps may be connected, an inner part comprising a bar of smaller diameter than the internal diameter of the tubular part and passing freely through the same and appreciably longer than the tubular part with eye ends connected to the ends of the bar and to which the reins may be connected, as set forth.

Signed by me this 13th day of July, 1903.

FRANK SWALES.

Witnesses:
 GEO. T. PINCKNEY,
 S. T. HAVILAND.